US008484068B2

(12) United States Patent
Godwin et al.

(10) Patent No.: US 8,484,068 B2
(45) Date of Patent: Jul. 9, 2013

(54) METHOD AND SYSTEM FOR EVALUATING CONSUMER DEMAND FOR MULTIPLE PRODUCTS AND SERVICES AT REMOTELY LOCATED EQUIPMENT

(75) Inventors: Bryan W. Godwin, Round Rock, TX (US); William J. Kalter, Austin, TX (US)

(73) Assignee: Crane Merchandising systems, Inc., Bridgeton, MO (US)

( * ) Notice: Subject to any disclaimer, the term of this patent is extended or adjusted under 35 U.S.C. 154(b) by 2580 days.

(21) Appl. No.: 11/302,759

(22) Filed: Dec. 14, 2005

(65) Prior Publication Data
US 2007/0136125 A1 Jun. 14, 2007

(51) Int. Cl.
*G06F 17/30* (2006.01)
(52) U.S. Cl.
USPC .......................................... 705/7.31; 705/7.29
(58) Field of Classification Search
USPC .................................................. 705/10, 7.31
See application file for complete search history.

(56) References Cited

U.S. PATENT DOCUMENTS

| | | | |
|---|---|---|---|
| 3,784,737 A | 1/1974 | Waehner | 178/6 |
| 4,369,442 A | 1/1983 | Werth et al. | 340/825.35 |
| 4,412,292 A | 10/1983 | Sedam et al. | 364/479 |
| 4,454,670 A | 6/1984 | Bachmann et al. | 40/584 |
| 4,553,211 A | 11/1985 | Kawasaki et al. | 364/479 |
| 4,611,205 A | 9/1986 | Eglise | 340/825.35 |
| 4,661,862 A | 4/1987 | Thompson | 358/335 |
| 4,677,565 A | 6/1987 | Ogaki et al. | 364/479 |
| 4,766,548 A | 8/1988 | Cedrone et al. | 364/479 |
| 4,850,009 A | 7/1989 | Zook et al. | 379/96 |
| 4,926,996 A | 5/1990 | Eglise et al. | 194/212 |
| 4,954,697 A | 9/1990 | Kokubun et al. | 235/381 |
| 5,029,098 A | 7/1991 | Lavasseur | 364/479 |
| 5,077,582 A | 12/1991 | Kravette et al. | 355/206 |
| 5,090,589 A | 2/1992 | Brandes et al. | 221/2 |
| 5,091,713 A | 2/1992 | Horne et al. | 340/541 |
| 5,117,407 A | 5/1992 | Vogel | 369/30 |

(Continued)

FOREIGN PATENT DOCUMENTS

| | | |
|---|---|---|
| DE | 4140450 A1 | 6/1993 |
| EP | 0564736 A1 | 10/1993 |

(Continued)

OTHER PUBLICATIONS

International Preliminary Examination Report PCT/US01/31381, 7 pages, May 12, 2003.

(Continued)

*Primary Examiner* — Andre Boyce
*Assistant Examiner* — Ernest A Jackson

(57) ABSTRACT

A method and system are provided for estimating consumer demand at remotely located equipment and establishing dispatch schedules for servicing the remotely located equipment. Data from the remotely located equipment may be classified into a hierarchy or various levels of reliability for use in calculating a consumer demand estimate for each product and/or each service available at the remotely located equipment. A full set of sales data for each product or service over multiple time intervals with no equipment problems, no out of stock conditions and no other operating problems may be classified as the highest level of reliability and predictability possible for calculating a consumer demand estimate. The lowest level of data used to calculate a consumer demand estimate may be a historical average of daily sales for all products or services sold over a long period of time at the remotely located equipment.

28 Claims, 4 Drawing Sheets

U.S. PATENT DOCUMENTS

| | | | | |
|---|---|---|---|---|
| 5,184,179 A | 2/1993 | Tarr et al. | | 355/206 |
| 5,207,784 A | 5/1993 | Schwartzendruber | | 221/6 |
| 5,239,480 A | 8/1993 | Huegel | | 364/479 |
| 5,255,819 A | 10/1993 | Peckels | | 222/1 |
| 5,282,127 A | 1/1994 | Mii | | 364/479 |
| 5,323,155 A | 6/1994 | Iyer et al. | | 341/51 |
| 5,337,253 A | 8/1994 | Berkovsky et al. | | 364/479 |
| 5,339,250 A | 8/1994 | Durbin | | 364/479 |
| 5,371,348 A | 12/1994 | Kumar et al. | | 235/472 |
| 5,386,360 A | 1/1995 | Wilson et al. | | 364/146 |
| 5,400,246 A | 3/1995 | Wilson et al. | | 364/146 |
| 5,418,945 A | 5/1995 | Carter et al. | | 395/600 |
| 5,445,295 A | 8/1995 | Brown | | 221/3 |
| 5,505,349 A | 4/1996 | Peckels | | 222/641 |
| 5,507,411 A | 4/1996 | Peckels | | 222/1 |
| 5,561,604 A | 10/1996 | Buckley et al. | | 364/479.05 |
| 5,608,643 A | 3/1997 | Wichter et al. | | 364/479.14 |
| 5,620,079 A | 4/1997 | Molbak | | 194/217 |
| 5,649,308 A | 7/1997 | Andrews | | 370/334 |
| 5,671,362 A | 9/1997 | Cowe et al. | | 395/228 |
| 5,701,252 A | 12/1997 | Facchin et al. | | 364/479 |
| 5,708,223 A | 1/1998 | Wyss | | 73/865.9 |
| 5,769,269 A | 6/1998 | Peters | | 221/7 |
| 5,787,149 A | 7/1998 | Yousefi et al. | | 379/59 |
| 5,794,144 A | 8/1998 | Comer et al. | | 455/426 |
| 5,805,997 A | 9/1998 | Farris | | 455/461 |
| 5,815,652 A | 9/1998 | Ote et al. | | 395/183.07 |
| 5,818,603 A | 10/1998 | Motoyama | | 358/296 |
| 5,822,216 A | 10/1998 | Satchell, Jr. et al. | | 364/479.01 |
| 5,841,866 A | 11/1998 | Bruwer et al. | | 380/23 |
| 5,842,597 A | 12/1998 | Kraus et al. | | 221/150 R |
| 5,844,808 A | 12/1998 | Konsmo et al. | | 364/479.14 |
| 5,850,187 A | 12/1998 | Carrender et al. | | 340/825.54 |
| 5,860,362 A | 1/1999 | Smith | | 101/494 |
| 5,862,517 A | 1/1999 | Honey et al. | | 702/85 |
| 5,867,688 A | 2/1999 | Simmon et al. | | 395/500 |
| 5,892,758 A | 4/1999 | Argyroudis | | 370/335 |
| 5,898,904 A | 4/1999 | Wang | | 455/31.3 |
| 5,905,442 A | 5/1999 | Mosebrook et al. | | 340/825.06 |
| 5,905,882 A | 5/1999 | Sakagami et al. | | |
| 5,907,491 A | 5/1999 | Canada et al. | | 364/468.15 |
| 5,909,183 A | 6/1999 | Borgstahl et al. | | 340/825.22 |
| 5,915,207 A | 6/1999 | Dao et al. | | 455/9 |
| 5,918,213 A | 6/1999 | Bernard et al. | | 705/26 |
| 5,924,081 A | 7/1999 | Ostendorf et al. | | 705/30 |
| 5,930,770 A | 7/1999 | Edgar | | 705/28 |
| 5,930,771 A | 7/1999 | Stapp | | 705/28 |
| 5,941,363 A | 8/1999 | Partyka et al. | | 194/217 |
| 5,943,042 A | 8/1999 | Siio | | 345/172 |
| 5,949,779 A | 9/1999 | Mostafa et al. | | 370/389 |
| 5,950,630 A | 9/1999 | Portwood et al. | | 128/897 |
| 5,953,707 A * | 9/1999 | Huang et al. | | 705/10 |
| 5,956,487 A | 9/1999 | Venkatraman et al. | | 395/200.48 |
| 5,957,262 A | 9/1999 | Molbak et al. | | 194/200 |
| 5,959,536 A | 9/1999 | Chambers et al. | | 340/636 |
| 5,959,869 A | 9/1999 | Miller et al. | | 364/479.1 |
| 5,979,757 A | 11/1999 | Tracy et al. | | 235/383 |
| 5,982,325 A | 11/1999 | Thornton et al. | | 342/357.07 |
| 5,982,652 A | 11/1999 | Simonelli et al. | | 363/142 |
| 5,986,219 A | 11/1999 | Carroll et al. | | 177/1 |
| 5,991,749 A | 11/1999 | Morrill, Jr. | | 705/44 |
| 5,997,170 A | 12/1999 | Brodbeck | | 364/479.06 |
| 6,003,070 A | 12/1999 | Frantz | | 709/206 |
| 6,005,850 A | 12/1999 | Moura et al. | | 370/282 |
| 6,006,196 A * | 12/1999 | Feigin et al. | | 705/10 |
| 6,012,041 A | 1/2000 | Brewer et al. | | 705/28 |
| 6,021,324 A | 2/2000 | Sizer, II et al. | | 455/403 |
| 6,021,437 A | 2/2000 | Chen et al. | | 709/224 |
| 6,029,143 A | 2/2000 | Mosher et al. | | 705/28 |
| 6,032,202 A | 2/2000 | Lea et al. | | 710/8 |
| 6,038,491 A | 3/2000 | McGarry et al. | | 700/231 |
| 6,052,667 A | 4/2000 | Walker et al. | | 705/15 |
| 6,052,750 A | 4/2000 | Lea | | 710/72 |
| 6,056,194 A | 5/2000 | Kolls | | 235/381 |
| 6,057,758 A | 5/2000 | Dempsey et al. | | 340/539 |
| 6,061,668 A | 5/2000 | Sharrow | | 705/400 |
| 6,068,305 A | 5/2000 | Myers et al. | | 292/201 |
| 6,070,070 A | 5/2000 | Ladue | | 455/419 |
| 6,072,521 A | 6/2000 | Harrison et al. | | 348/12 |
| 6,084,528 A | 7/2000 | Beach et al. | | 340/825.35 |
| 6,085,888 A | 7/2000 | Tedesco et al. | | 194/217 |
| 6,109,524 A | 8/2000 | Kanoh et al. | | 235/381 |
| 6,119,053 A | 9/2000 | Taylor et al. | | 700/231 |
| 6,119,100 A | 9/2000 | Walker et al. | | 705/20 |
| 6,124,800 A | 9/2000 | Beard et al. | | 340/825.35 |
| 6,131,399 A | 10/2000 | Hall | | 62/127 |
| 6,151,582 A | 11/2000 | Huang et al. | | |
| 6,161,059 A | 12/2000 | Tedesco et al. | | 700/232 |
| 6,163,811 A | 12/2000 | Porter | | 709/247 |
| 6,181,981 B1 | 1/2001 | Varga et al. | | 700/236 |
| 6,185,545 B1 | 2/2001 | Resnick et al. | | 705/40 |
| 6,199,753 B1 | 3/2001 | Tracy et al. | | 235/375 |
| 6,230,150 B1 * | 5/2001 | Walker et al. | | 705/400 |
| 6,272,395 B1 | 8/2001 | Brodbeck | | 700/236 |
| 6,289,453 B1 | 9/2001 | Walker et al. | | 713/175 |
| 6,304,895 B1 | 10/2001 | Schneider et al. | | 709/203 |
| 6,317,649 B1 | 11/2001 | Tedesco et al. | | 700/232 |
| 6,324,520 B1 | 11/2001 | Walker et al. | | 705/16 |
| 6,338,149 B1 | 1/2002 | Ciccone, Jr. et al. | | 714/38 |
| 6,339,731 B1 | 1/2002 | Morris et al. | | 700/236 |
| 6,341,271 B1 | 1/2002 | Salvo et al. | | 705/28 |
| 6,356,794 B1 | 3/2002 | Perin, Jr. et al. | | 700/78 |
| 6,385,772 B1 | 5/2002 | Courtney | | 725/105 |
| 6,427,912 B1 | 8/2002 | Levasseur | | 235/381 |
| 6,434,534 B1 | 8/2002 | Walker et al. | | 705/14 |
| 6,437,692 B1 | 8/2002 | Petite et al. | | 340/540 |
| 6,442,532 B1 | 8/2002 | Kawan | | 705/35 |
| 6,457,038 B1 | 9/2002 | Defosse | | 709/200 |
| 6,462,644 B1 | 10/2002 | Howell et al. | | 340/5.92 |
| 6,467,685 B1 | 10/2002 | Teicher | | 235/379 |
| 6,502,131 B1 | 12/2002 | Vaid et al. | | 709/224 |
| 6,505,095 B1 | 1/2003 | Kolls | | 700/244 |
| 6,525,644 B1 | 2/2003 | Stillwagon | | 340/5.61 |
| 6,550,672 B1 | 4/2003 | Tracy et al. | | 235/383 |
| 6,553,336 B1 | 4/2003 | Johnson et al. | | 702/188 |
| 6,581,986 B2 | 6/2003 | Roatis et al. | | 292/199 |
| 6,584,309 B1 | 6/2003 | Whigham | | 455/414 |
| 6,585,622 B1 | 7/2003 | Shum et al. | | 482/8 |
| 6,604,086 B1 | 8/2003 | Kolls | | 705/14 |
| 6,604,087 B1 | 8/2003 | Kolls | | 705/14 |
| 6,606,602 B1 | 8/2003 | Kolls | | 705/14 |
| 6,606,605 B1 | 8/2003 | Kolls | | 705/26 |
| 6,609,113 B1 | 8/2003 | O'Leary et al. | | 705/39 |
| 6,615,623 B1 | 9/2003 | Ormerod | | 70/224 |
| 6,695,166 B2 | 2/2004 | Long | | 221/14 |
| 6,704,714 B1 | 3/2004 | O'Leary et al. | | 705/39 |
| 6,712,266 B2 | 3/2004 | Bartley et al. | | 235/380 |
| 6,714,977 B1 | 3/2004 | Fowler et al. | | 709/224 |
| 6,735,630 B1 | 5/2004 | Gelvin et al. | | 709/224 |
| 6,738,811 B1 | 5/2004 | Liang | | 709/224 |
| 6,748,296 B2 | 6/2004 | Banerjee et al. | | 700/241 |
| 6,751,562 B1 | 6/2004 | Blackett et al. | | 702/61 |
| 6,754,558 B2 | 6/2004 | Preston et al. | | 700/236 |
| 6,772,048 B1 | 8/2004 | Leibu et al. | | 700/241 |
| 6,826,607 B1 | 11/2004 | Gelvin et al. | | 709/224 |
| 6,832,251 B1 | 12/2004 | Gelvin et al. | | 709/224 |
| 6,837,436 B2 | 1/2005 | Swartz et al. | | 235/472.02 |
| 6,844,813 B2 | 1/2005 | Hardman | | 340/539.1 |
| 6,850,252 B1 | 2/2005 | Hoffberg | | 345/716 |
| 6,859,831 B1 | 2/2005 | Gelvin et al. | | 709/224 |
| 6,867,685 B1 | 3/2005 | Stillwagon | | 340/5.64 |
| 6,876,988 B2 | 4/2005 | Helsper et al. | | 706/21 |
| 6,900,720 B2 | 5/2005 | Denison et al. | | 340/5.9 |
| 6,925,335 B2 | 8/2005 | May et al. | | 700/9 |
| 6,959,265 B1 | 10/2005 | Candela et al. | | 702/186 |
| 6,973,475 B2 | 12/2005 | Kenyon et al. | | 709/203 |
| 7,017,085 B2 | 3/2006 | Braun | | 714/47 |
| 7,076,329 B1 | 7/2006 | Kolls | | 700/232 |
| 7,131,575 B1 | 11/2006 | Kolls | | 235/379 |
| 7,167,892 B2 | 1/2007 | Defosse et al. | | |
| 7,191,034 B2 | 3/2007 | Whitten et al. | | 700/244 |
| 7,286,901 B2 | 10/2007 | Whitten et al. | | 700/244 |
| 2001/0002210 A1 | 5/2001 | Petite | | 379/155 |
| 2001/0034566 A1 | 10/2001 | Offer | | 700/236 |
| 2001/0042121 A1 | 11/2001 | Defosse et al. | | 709/224 |
| 2001/0047410 A1 | 11/2001 | Defosse | | 709/224 |
| 2001/0054083 A1 | 12/2001 | Defosse | | 709/217 |

| | | | | |
|---|---|---|---|---|
| 2002/0016829 | A1* | 2/2002 | Defosse | 709/217 |
| 2002/0024420 | A1 | 2/2002 | Ayala et al. | 340/5.61 |
| 2002/0032470 | A1 | 3/2002 | Linberg | 607/60 |
| 2002/0077724 | A1 | 6/2002 | Paulucci et al. | 700/231 |
| 2002/0082665 | A1 | 6/2002 | Haller et al. | 607/60 |
| 2002/0107610 | A1 | 8/2002 | Kaehler et al. | 700/232 |
| 2002/0169539 | A1 | 11/2002 | Menard et al. | 701/200 |
| 2002/0194387 | A1 | 12/2002 | Defosse | 709/251 |
| 2003/0003865 | A1 | 1/2003 | Defosse et al. | 455/41 |
| 2003/0013482 | A1 | 1/2003 | Brankovic | 455/553 |
| 2003/0050841 | A1 | 3/2003 | Preston et al. | 705/16 |
| 2003/0061094 | A1 | 3/2003 | Banerjee et al. | 705/14 |
| 2003/0065550 | A1* | 4/2003 | Hoffman et al. | 705/10 |
| 2003/0074106 | A1 | 4/2003 | Butler | 700/236 |
| 2003/0088474 | A1 | 5/2003 | Hoffman et al. | |
| 2003/0097474 | A1 | 5/2003 | Defosse et al. | 709/246 |
| 2003/0101262 | A1 | 5/2003 | Godwin | 709/224 |
| 2003/0128101 | A1 | 7/2003 | Long | 340/5.26 |
| 2003/0204391 | A1 | 10/2003 | May et al. | 704/8 |
| 2004/0133653 | A1* | 7/2004 | Defosse et al. | 709/217 |
| 2004/0207509 | A1 | 10/2004 | Mlynarczyk et al. | 340/5.23 |
| 2005/0043011 | A1 | 2/2005 | Murray et al. | |
| 2005/0131577 | A1 | 6/2005 | Ota et al. | 700/242 |
| 2005/0161953 | A1 | 7/2005 | Roatis et al. | 292/199 |
| 2005/0179544 | A1 | 8/2005 | Sutton et al. | 340/543 |
| 2006/0106490 | A1* | 5/2006 | Howell et al. | 700/233 |
| 2007/0096867 | A1 | 5/2007 | Denison et al. | 340/5.23 |
| 2008/0140515 | A1 | 6/2008 | Godwin | |

FOREIGN PATENT DOCUMENTS

| | | |
|---|---|---|
| EP | 0602787 A2 | 10/1993 |
| EP | 0817138 A1 | 1/1998 |
| EP | 0999529 | 5/2000 |
| EP | 1096408 | 5/2001 |
| FR | 2744545 | 2/1996 |
| FR | 2755776 | 5/1998 |
| JP | 04253294 | 9/1992 |
| JP | 6296335 A2 | 10/1994 |
| JP | 9198172 A2 | 7/1997 |
| JP | 10105802 | 4/1998 |
| WO | 8907807 | 8/1989 |
| WO | 9504333 | 2/1995 |
| WO | 9505609 | 2/1995 |
| WO | 9709667 | 3/1997 |
| WO | 9845779 | 10/1998 |
| WO | 9923620 | 5/1999 |
| WO | 9927465 | 6/1999 |
| WO | 9936751 | 7/1999 |
| WO | 9948065 | 9/1999 |
| WO | 0004475 | 1/2000 |
| WO | 0004476 | 1/2000 |
| WO | 0031701 | 6/2000 |
| WO | 0219281 | 3/2002 |

OTHER PUBLICATIONS

International Search Report for PCT/US99/05983, 7 pages, Mailed Aug. 13, 1999.

International Search Report PCT US 01/41640, 7 pages, Mailed Aug. 21, 2002.

International Search Report PCT/US 01/31381, 7 pages, Mailed Nov. 7, 2002.

International Search Report PCT/US01/15522, 7 pages, Mailed May 16, 2002.

International Search Report PCT/US01/16749, 7 pages, Mailed Dec. 20, 2001.

American Power Conversion Internet Article, "Lightning Advisor", at internet, <http://lightning.apcc.com>, Printed May 10, 2000.

American Products Internet Article, "Product Information", at internet, <http://www.apc.com>, Printed May 10, 2000.

Left high and dry? Sold-out machine sends for Cokes; Nashville Banner, Aug. 16, 1995.

Leitch, Carolyn, "Coke machines signal when it's time for a refill"; The Globe & Mail, Toronto, Ontario, Aug. 30, 1995.

Meet the Smart Coke Machine; The Sacramento Bee Business Technology; Wednesday, Aug. 30, 1995.

NetBotz Internet Article, "Welcome to Netbotz" at internet <http:www.netbotz.com>, Printed May 10, 2000.

Skywire allows vendor tracking of pop stock and sales details; RCR, vol. 14, No. 17, Sep. 4, 1995.

Skywire Provides Details of Wireless 'VendView' System; Vending Times, Sep. 1994.

Wireless Communications Forum; vol. III, No. 1 pp. 25-30, Apr. 1995.

International Search Report PCT/US 03/37776, 14 pages, Mailed May 17, 2004.

*BT redcare Telemetry Vending Interface Unit (VIU)*, Antronics Ltd Case Study, <http:www.antronic.co.uk/portfolio/viu>, 4 pgs., Printed Sep. 19, 2005.

Maxim/Dallas, "What is an iButton?" at internet http://www.maxim-ic.com/products/ibutton/ibuttons/, 3 pages, Printed Dec. 29, 2005.

NAMA White Paper: Cashless Vending, The National Automatic Merchandising Association (34 pages), 2004.

Cashless—Definition from the Merriam-Webster Online Dictionary; 2 pages, Printed Sep. 9, 2008.

Office Action dated Apr. 1, 2010 in connection with U.S. Appl. No. 12/035,074.

Office Action dated Sep. 17, 2010 in connection with U.S. Appl. No. 12/035,074.

Notification of Transmittal of the International Search Report and the Written Opinion of the International Searching Authority dated Apr. 12, 2011 in connection with International Patent Application No. PCT/US09/34906.

Extended European Search Report dated Nov. 29, 2012 in connection with European Patent Application No. 09712876.3, 6 pages.

Office Action dated Mar. 29, 2013 in connection with U.S. Appl. No. 12/035,074, filed Feb. 21, 2008.

* cited by examiner

METHOD AND SYSTEM FOR EVALUATING CONSUMER DEMAND FOR MULTIPLE PRODUCTS AND SERVICES AT REMOTELY LOCATED EQUIPMENT

CROSS REFERENCE TO RELATED APPLICATION

This application is related to U.S. patent application Ser. No. 09/853,366 filed May 11, 2001 (now U.S. Pat. No. 7,013, 337), which claims priority from U.S. Provisional Patent Application Ser. No. 60/203,682, filed May 12, 2000, and entitled "METHOD AND SYSTEM FOR THE OPTIMAL FORMATTING, REDUCTION AND COMPRESSION OF DEX/UCS DATA."

TECHNICAL FIELD

The present disclosure is related to equipment and methods used to evaluate data associated with business functions and transactions and more particularly to providing better estimates of consumer demand for products and services.

BACKGROUND

Vending machine manufacturers have developed new and innovative vending equipment in response to market needs and vending operator demands. These innovations have been, for the most part, adopted by the vending industry. This trend has been influenced by accelerating rates of technological innovation in electronic and electro-mechanical component industries. Availability of new technologies has given vending machine manufacturers appropriate tools to address many requirements of vending operators. Advances in electronics are now enabling use of computer controls and data acquisition systems within each vending machine. Many vending machines include vending machine controllers based on the International Multi-drop Bus Interface Standards developed by the National Automatic Merchandising Association (NAMA). Some of the latest vending machines make it possible for vending operators to download data and information associated with sales, inventory, and equipment status at remote locations onto portable computers or transmit vending machine data and information from a remote location to a central location such as a network operations center.

The Uniform Communication Standard (UCS) was established during the mid-1960s to facilitate and improve data transfer within the grocery industry. The Uniform Communication Standard may be generally described a subset of ANSI ASCX12 national standard for electronic data interchange (EDI). UCS implementation guidelines and communication standards are now used to support transactions associated with manufacturers, retailers, wholesalers, shipping companies, brokers, public warehouses, service merchandising and many other industries. Business functions such as data administration, ordering, logistics, financial and other support activities are routinely completed using UCS guidelines and standards.

UCS standards have been applied to direct store delivery (DSD) transactions. UCS transaction sets have been developed to exchange delivery information and adjustments between buyers and sellers or suppliers using electronic devices including, but not limited to, handheld computers and personal computers at the time of delivery at individual store locations or other individual facilities. The UCS/DSD software applications often have two components sometimes referred to as DEX/UCS (Direct Exchange) linking computers of suppliers and sellers to facilitate exchange of delivery data at specific locations and NEX/UCS (Network Exchange) linking office computers and large enterprise communication networks with each other. DEX/UCS software applications are frequently used with computerized delivery and receiving systems for a wide variety of products, services and industries. The previously described standards and related software applications have been used to monitor, record and evaluate sales of products at remotely located equipment such as vending machines.

Previous methods of estimating consumer demand at remotely located equipment such as vending machines often included measuring product inventory at a first time and measuring the same product inventory at a second time, often several days later. Total product sales may then be calculated by subtracting the second product inventory from the first product inventory. The rate of sales or sales rate for the product may be calculated as the total product sales divided by the number of days between recording the first product inventory and the second product inventory. The resulting sales rate, typically stated on a daily basis, is often used to project future consumer demand for the product at the remotely located equipment. The sales rate may also be used to schedule service calls at the remotely located equipment to restock inventory, refill an associated coin changer and perform other routine maintenance at the remotely located equipment.

SUMMARY OF THE DISCLOSURE

A method and system are provided for estimating consumer demand for products or service at remotely located equipment, predicting future sales, future inventory, potential lost sales and establishing dispatch schedules for optimum refill and/or maintenance of the remotely located equipment based on predictions of future inventory, future lost sales and/or equipment operating history. Components of the system may include a predictive algorithm operable to process high volumes of data, a broad range of networks operable to provide flexible data communication and hand held devices operable to enhance the communication of data while servicing remotely located equipment. Data from the remotely located equipment may be characterized or classified into a hierarchy or various levels of reliability for use in calculating a consumer demand estimate for each product and/or each service available at the remotely located equipment.

The method and system may allow calculating a consumer demand estimate for products and services at remotely located equipment similar to consumer demand if a twenty-four hour store with all required personnel, inventory, operating equipment and change money was satisfactorily functioning at the same location. Consumer demand estimates calculated in accordance with teachings of the present disclosure and associated predictions of future sales, future inventory and potential lost sales may allow establishing dispatch schedules to allow the remotely located equipment to remain in operation, properly stocked with products for sale or materials required to perform services with an operating efficiency similar to a traditional retail outlet operating twenty-four hours per day at the same location as the remotely located equipment. The present disclosure may be used to predict or estimate consumer demand in industries such as cold drink vending, fast food vending, fountain drinks, ice merchandising, printing, imaging, and automated teller machines.

Another aspect of the present disclosure includes the ability to distinguish between consumer demand for various types of similar products or services at the same remotely located equipment. For example, a vending machine may carry four or five different types of soft drinks produced by the same manufacturer. Maintaining a rich DEX data history for each type of product allows estimating consumer demand for each product type sold from the vending machine and allows estimating consumer demand for each variation in product type.

A further aspect of the present disclosure includes providing a hierarchy of data which may be used to estimate consumer demand for each product or service available at remotely located equipment. For some products and services a rich DEX data history of sales and operating status of associate remotely located equipment may be available. At other products and services a less rich history of DEX data or no DEX data may be available.

In accordance with the teachings of the present disclosure, a system and method are provided to allow calculating a consumer demand estimate ("CDE") using one or more different levels of data depending upon operating history of remotely located equipment and quantity, quality and reliability of available inventory data from remotely located equipment. The system and method avoid using of product sales rate or service sales rate which may often provide inaccurate indications of actual consumer demand for a product or a service at remotely located equipment. Traditional methods used to calculate rate of product sales or rate of service sales at remotely located equipment often do not take into consideration decreases in sales which may occur due to lack of inventory, wrong inventory or equipment problems.

A predictive algorithm may be used to calculate consumer demand estimates based on a hierarchy of inventory data and equipment operating status. The predictive algorithm may also use such consumer demand estimates to predict future product or service sales, future inventory and potential lost sales. A dispatch algorithm may use such future inventory and potential lost sales to develop a dispatch schedule for servicing multiple machines at different locations.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE EMBODIMENTS

Figure 1A:
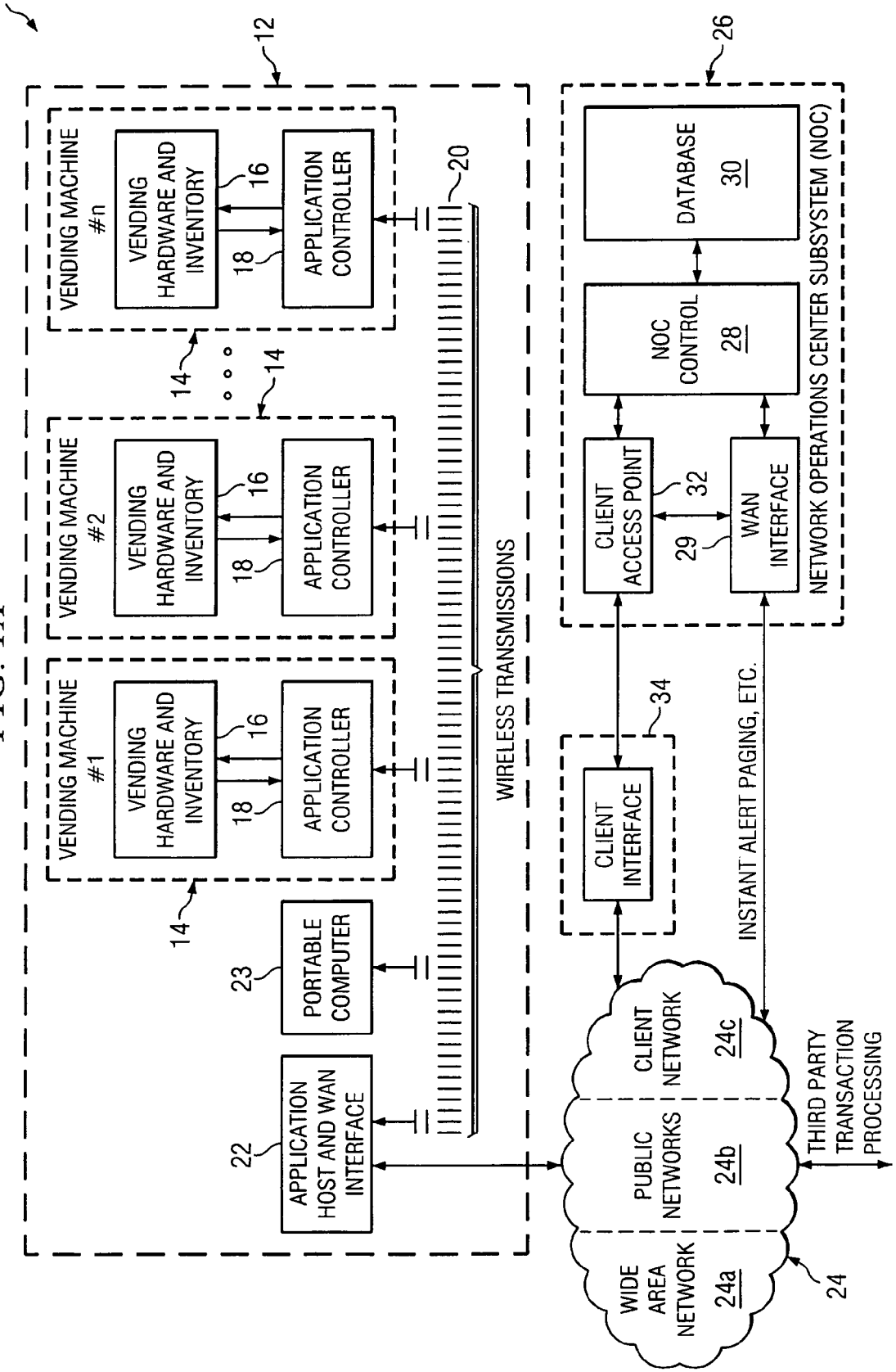
FIG. 1A is a block diagram showing one example of a system for communicating information between remotely located equipment and a network operations center for use in calculating consumer demand estimates and establishing dispatch schedules for the remotely located equipment.

Preferred embodiments of the disclosure and its advantages may best be understood by referring to FIGS. 1A-3B of the drawings, like numerals being used for like and corresponding parts of the various drawings.

One prior method of calculating product sales rate for vending machines often includes recording a first DEX record inventory level for Product A on day one; recording a second DEX record inventory level for Product A on day five; subtracting the second DEX record inventory level from the first DEX record inventory level to determine the total number of Product A which was sold. The total number of Product A sold was then divided by five days to calculate the sales rate for Product A per day.

Predictions of future sales based on a product sales rate have often proven to be inaccurate because the inventory history (DEX) records may be unreliable, electrical and/or mechanical malfunctions may occur at remotely located equipment which are not noted in associated DEX records or the remotely located equipment may spend a substantial amount of time in an error state. Actual consumer demand for a particular type of soft drink may be very high at a vending machine while the calculated sales rate may be relatively low. For example, on the first day after a vending machine is serviced, twenty cans of soft drink A may be sold. On the second day a malfunction in an associated coin return may result in no further change in inventory for three (3) more days until the next service visit. Therefore, the calculated sales rate may be very low (20 divided by 4 or 5 cans of soft drink A per day). The actual consumer demand, if the vending machine had been operating properly with the required inventory of soft drink A may have been approximately 20 cans of soft drink A per day.

The term "consumer demand" may be used in this application to describe the amount of sales of a product or service which would occur at remotely located equipment assuming the remotely located equipment is operating satisfactorily in accordance with designed operating conditions, the remotely located equipment has products or services which consumers wish to buy and no products or services are out of stock.

The term "dispatch schedule" may be used in this application to describe any type of schedule for sending personnel to service and/or maintain remotely located equipment. For example, a dispatch schedule may be used to refill products at remotely located equipment based at least in part on consumer demand estimates calculated in accordance with teachings of the present disclosure, to perform periodic routine maintenance at remotely located equipment based at least in part on historical operating data collected in accordance with teachings of the present disclosure and to schedule visits at remotely located equipment in response to significant equipment malfunctions and/or out of stock conditions.

The term "remotely located equipment" may be used in this application to refer to any automatic sales machine that allows payment to be exchanged for goods or services including, but not limited to, all types of vending machines, snack machines, beverage machines, automatic teller machines (ATMs), postage stamp dispensers, arcade machines, slot machines, laundry machines and car wash equipment.

The terms "stock keeping unit" and "SKU" may be used in this application as a unique identifier to keep track of a specific product inventory or materials used to provide services at remotely located equipment. For example, an SKU in a vending machine may be a row or a column having the same product which may be dispensed from the vending machine upon appropriate payment and selection by customer. For some applications an SKU may include more than one column or more than one row in a vending machine if the same product is maintained in each of the rows or columns.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, ethernet cabling (10baseT, 100baseT, etc.), coaxial cables, T-1 lines, T-3 lines, ISDN lines, ADSL, etc.

The term "wireless transmissions" may be used to refer to all types of electromagnetic communications which do not require a wire, cable, or other types of conduits. Examples of wireless transmissions which may be used include, but are not limited to, personal area networks (PAN), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

A full set of sales data for each product per SKU over multiple time intervals with no equipment problems, no out of stock conditions and no other operating problems may be classified as the highest level or Level 1 data. A consumer demand estimate calculated using Level 1 data in accordance with teachings of the present disclosure will typically have the highest reliability or confidence possible with the associated data collection system. Predictions of future sales, future inventory and potential lost sales using such consumer demand estimates will also generally have the highest reliability or confidence possible with the associated data collection system.

When no specific data is available for a new product or service and no specific sales history is available for other products or services at the remotely located equipment, lower levels of data or less reliable data may be used to calculate consumer demand estimates and to predict future sales, future inventory and potential lost sales. For example, the lowest level of data used to calculate a consumer demand estimate may be a historical average of daily sales for all products sold over a long period of time at the remotely located equipment. The historical average daily sales may be used to initially predict future sales, future inventory and potential lost sales of a new product or service at the same location and to establish an initial dispatch schedule. One example of such low level data for calculating a consumer demand estimate for a vending machine may be a statement such as at remote location A, forty percent (40%) of all products will be sold between a first visit and a second visit seven days later.

FIG. 1A may be generally described as a functional block diagram of one example of a data acquisition system for remotely located equipment, indicated generally at 10. Data acquisition system 10 may be used to transmit, receive, store and evaluate data and other information associated with machine to machine business transactions. Examples of such business transactions include, but are not limited to, communications between a machine and a network operations center, communications between multiple machines and communications between multiples machines, multiple handheld computers, a network operations center and multiple service centers for remotely located equipment.

Data acquisition system 10 may communicate data or information from a remote location such as vending site 12 externally over a wide area wireless or wire-line network and internally over a local area wireless or wire-line network. Wireless personal area networks (PAN) may also be used to communicate with remote location 12. A local area network at vending site 12 may be referred to as a vendor interrogation LAN subsystem (VIL). Vending site 12 may include various types of remotely located equipment such as vending machines 14. Each vending machine 14 may include vending hardware and inventory 16 for performing vending functions and electronically tracking vending information and equipment operating status. The vending hardware may include multiple SKUs (not expressly shown). Vending machines 14 may provide various types of products to customers such as soft drinks, snacks, etc.

Each vending machine 14 may include application controller 18 coupled to and interfacing with vending hardware and inventory 16. Vending machines 14 may be equipped with electronics for controlling vending operations as well as tracking some vending events such as money received, change given and number of vends from each SKU. Application controllers 18 may communicate with such embedded electronics as well as be equipped to directly sense other vending events and vending equipment parameters (e.g. compressor performance). Application controllers 18 may also communicate with one another and application host 22 via onboard wire-line interfaces or wireless transceivers using wire-line or wireless transmissions respectively.

Together, application controllers 18 and application host 22 form a LAN supported by the wire-line and/or wireless transmissions 20. In addition, application controllers 18 may also act as repeaters in case application host 22 may not directly communicate with a particular application controller 18 while another application controller 18, which does have an established communication link with application host 22, may directly communicate.

Application host 22 may acquire data captured by application controllers 18 and package and communicate such data across one or more external communication networks 24. Examples of such external communication networks may include wide area networks 24a, public communication networks 24b and client networks or private networks 24c. Each of these networks may include a wide variety of wire-line transmission techniques and/or wireless transmission techniques. For example, public communication networks 24b may include, but are not limited to, a public switched telephone network (PSTN), the internet, IP telephony, cable networks and a wide variety of wireless networks which are being developed in many communities for access by the general public. The boundaries or dividing lines between "conventional" wide area networks, public communication networks and client networks or private networks are subject to substantial variations, overlaps and rapid change as communication technology and techniques are developed.

Application host 22 may be installed together with application controller 18 inside a vending machine or may be housed separately in another location. In the event that application host 22 is placed inside a vending machine together with application controller 18, it may be possible to share some electronic components such as a single LAN transceiver for example, in order to reduce the cost of the hardware. In this case, application host 22 and application controller 18 inside the same vending machine 14 may communicate with each other over a hardwired interface between the two components. Alternatively, application host 22 and application controller 18 may be designed to be a single integrated component within a single vending machine. For some systems, application host 22 may only be used to monitor associated application controllers 18. For example, such application host 22 may take the form of handheld portable computer 23 carried by service or delivery personnel in order to directly query application controllers 18 without having to interact via the WAN interface. Handheld portable computers 23 may communicate with application controllers 18 using a personal area network (PAN).

WAN interface 29 may be implemented in a number of ways. For example, WAN interface 29 may be designed to support all or portions of the communication techniques available through external network 24 via wire-line and/or wireless transmissions. External network 24 may include communication via conventional wide area networks 24a, public communication external network 24b and private or client networks 24c. If a wireless narrowband PCS paging network is used, messages from application host 22 may be communicated as digital messages through a pager network and stored in one or more dedicated message mailboxes provided by the wireless network operator. These mailboxes may be securely accessed, for example, through an Internet-based connection.

As shown in FIG. 1A, network operations center (NOC) 26 may communicate with one or more vending sites 12 across external network 24. Network operations center 26 may include NOC control 28 that communicates with external network 24 through WAN interface 29. WAN interface 29 between NOC control 28 and external network 24 may be implemented through the use of either wire-line or wireless transmissions.

NOC control 28 may receive data acquired from and transmit data to vending sites 12, process the data and store the data into database 30. NOC control 28 may also perform instant alert paging, direct dial alarms and other functions to provide real time notification to a vending operator upon the occurrence of certain events (e.g., out-of-stock, power outage, vandalism, etc.). NOC control 28 may include a wide variety of software products and algorithms to support many functions such as, but not limited to, third party transaction processing such as allowing queries on database 30. One or more application servers (not expressly shown) may be included as part of NOC 26 to communicate data between NOC control 28 and/or database 30. The application servers may also include one or more algorithms to facilitate calculating consumer demand estimates and dispatch schedules as discussed later in more detail. Application servers located NOC 26 may be used to prepare dispatch schedules, manage products or brands and provide various cash management function.

At network operations center 26, client access point 32 may accommodate direct access from client interface subsystem (CI) 34 or may accommodate access via external network 24. For some applications, client access point 32 may be a web-based interface allowing user access from client computers 84 via client interface subsystem 34. See FIG. 1B. In other applications direct-dial connections may be provided between client interface subsystem 34 and client access point 32. Once connected, a user may use client interface subsystem 34 to obtain information from database 30 including data from vending site 12. Users may also be provided with extended services such as consumer demand estimates for each product or service available at vending site 12 by analyzing data associated with inventory levels and equipment operating status maintained in database 30.

Network operations center 26 may also provide future sales, future inventory and potential lost sales for each machine #1 through machine #n based on respective consumer demand estimates calculated in accordance with teachings of the present disclosure. Dispatch schedules may also be prepared at network operations center based on future inventory and potential lost sales for machine #1 through machine #n.

Technical benefits of the present disclosure may include calculating consumer demand estimates at network operations center and using forecast models to predict optimum product allocation and to allow adjusting the various types and quantities of products at each machine #1 through machine #n to increase total revenue from product sales. Dispatch schedules provided by network operations center 26 may allow service personnel to deliver required products with fewer total trips and at higher refill rates per visit at each machine #1 through machine #n. Network operations center 26 may monitor and predict future sales, future inventory and potential lost sales at machine #1 through machine #n to minimize the chance of any out of stock condition.

Figure 1B:
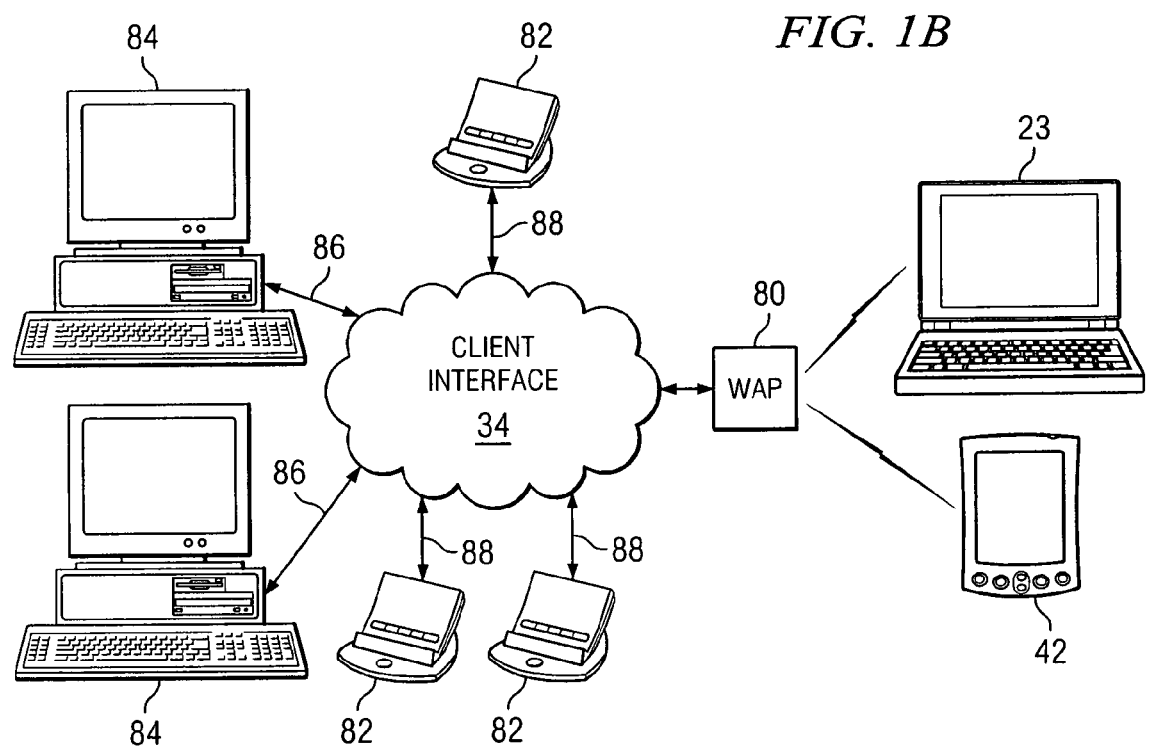
FIG. 1B is a schematic drawing showing one example of a client interface which may be used to provide information to and receive information from a network operations center and/or remotely located equipment.

For some applications such as shown in FIG. 1B client interface 34 may represent a local area network contained within a single building or facility. In a large metropolitan area network operations center 26 may communicate consumer demand estimates, future sales, future inventory, potential lost sales and/or dispatch schedules via client network 24c to one or more client interfaces 34 located at respective service centers (not expressly shown) responsible for maintaining inventory and/or performing maintenance on remotely located equipment assigned to each service center.

Figure 2:
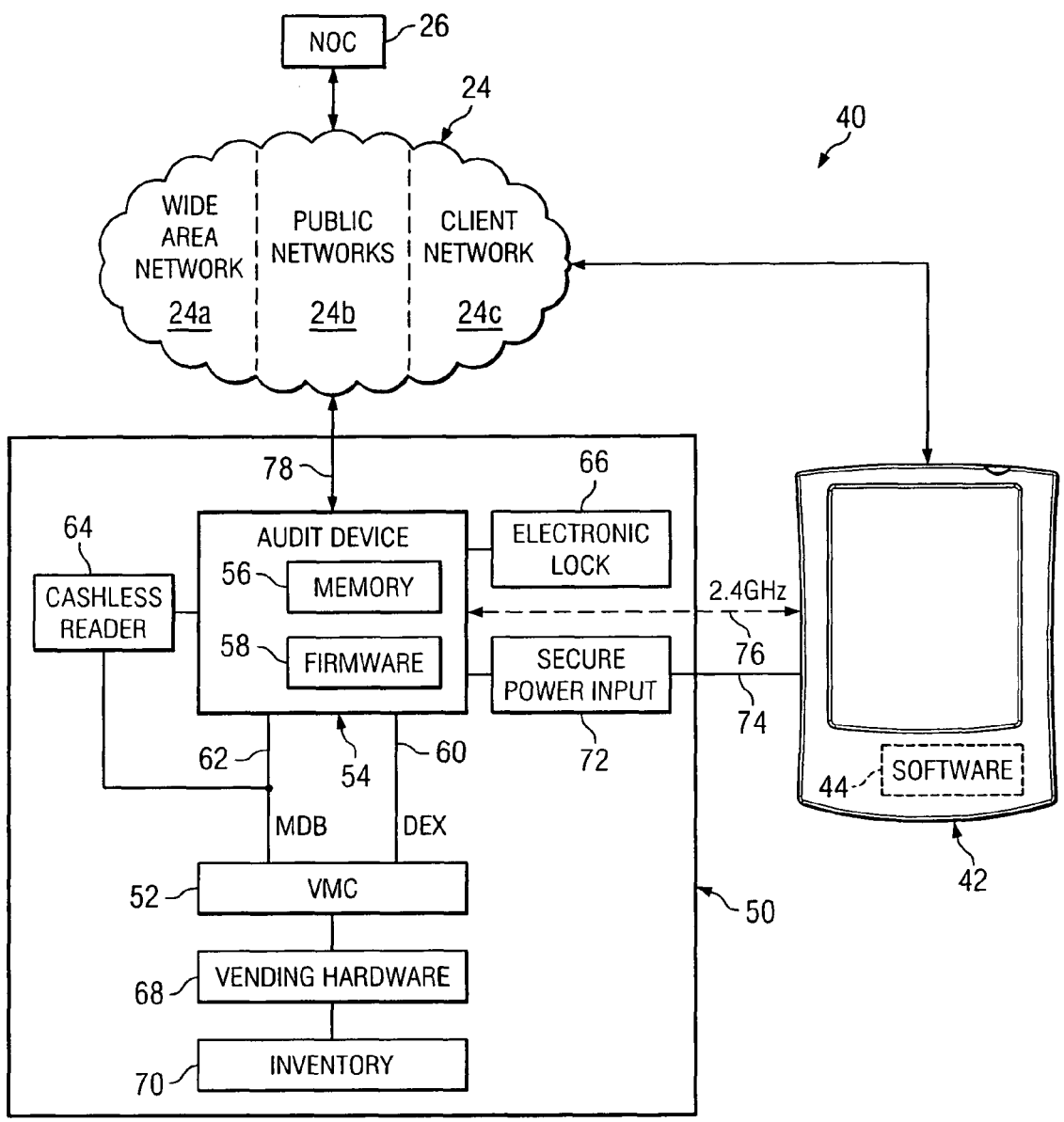
FIG. 2 is a block diagram showing one example of a data acquisition system operable to communicate information with a network operations center for use in calculating consumer demand estimates and establishing dispatch schedules for remotely located equipment such as a vending machine.

Client interface 34 may be operable to allow communication between multiple personal computers or desktop computers 84 via wire line access 86. Cradles 82 may be used to accommodate handheld computers or handheld devices 42 such as shown in FIG. 2. Cradles 82 may be used to both charge a battery (not expressly shown) in handheld device 42 and to communicate data through wire line transmission link 88 with client interface 34. For some applications link 88 may be an ethernet connection. Client interface 34 may also include multiple wireless access points 80. Portable computers 23 and handheld devices 42 may communicate with client interface 34 using wireless transmissions when in the vicinity of wireless access point 80.

For some applications an audit device may be placed within remotely located equipment to read inventory levels (DEX readings) and equipment operating status multiple times per day, storing DEX inventory records and equipment operating status at the remotely located equipment and/or transmitting DEX inventory records and equipment operating status to a network operations center. The audit device may include a multi-drop-bus (MDB) for communicating with an MDB interface of a controller associated with the remotely located equipment and a DEX interface for communicating with a DEX interface associated with the remotely located equipment controller. The audit device may also include an interface for communicating with a handheld computer. The audit device may include a clock and clock control logic for automatically synchronizing the clock and the audit device with a clock in the handheld computer. Nonvolatile memory may be included in the audit device for storing DEX data and MDB data. Audit control logic may also be included and operable to automatically collect DEX data and MDB data from each remotely located equipment controller. The audit control logic may further store timestamps with DEX data and MDB data to record current times for individual events and conditions within the remotely located equipment.

Inventory levels and equipment operating status for each available product or service may be measured multiple times each day depending upon the number of samplings or DEX readings taken per day. One of the technical benefits of an audit device may include the ability to monitor consumer demand for each product or service and to indicate changes in product sales or service depending upon the time, day of the week and equipment operating status at the remotely located equipment.

For example, if a portion of the remotely located equipment is inoperable for one or more days, the DEX history would indicate zero sales for those days but a substantially higher consumer demand or total sales for days in which the remotely located equipment was operating satisfactorily. One aspect of the present disclosure may include the ability to censor days when consumer demand may be unusually low such as when the remotely located equipment is turned off, an associated business or building is closed, the remotely located equipment is out of stock or mechanical problems may exist at the remotely located equipment. Deleting such days may allow calculating a consumer demand estimate which more closely matches actual or true consumer demand for each product or service.

One of the benefits of the present disclosure may also include the ability to calculate a consumer demand estimate based on a rich DEX history of changes in inventory levels as a function of date, time, equipment operating status and inventory levels for each type of product or service available at the remotely located equipment. Another benefit of the present disclosure may include providing owners and operators of remotely located equipment with detailed information concerning inventory levels, cash receipts and product or service sales similar to the quality and quantity of information available in traditional retail outlets. A system incorporating teachings of the present disclosure may allow owners and operators of remotely located equipment to review and evaluate sales data and equipment operating status data to improve customer satisfaction, increase operating efficiencies and create additional revenue opportunities.

An audit device may be used to automatically collect DEX data and equipment operating status according to predefined collection criteria. The audit device may store such audit data with associated timestamps to record occurrence times for individual events and conditions within the remotely located equipment. The audit device may also receive authentication information from a handheld computer at the audit device and in response to the authentication information, test the authentication information for validity. In response to receiving valid authentication data, the audit device may include synchronizing a clock in the audit device with a clock in the handheld computer and transferring at least a portion of the audit data to the handheld computer. The audit data may be transmitted by one or more communication techniques from the handheld computer to a network operation center for analysis of consumer demand for each product or service available at the remotely located equipment. See FIGS. 1B and 2.

FIG. 2 is a schematic drawing showing a block diagram of remotely located equipment and portions of a system for collecting, storing and communicating data and other information associated with operation of the remotely located equipment. The data may include product inventory levels, status of various components associated with the remotely located equipment and transactions conducted at the remotely located equipment.

Data collecting, storing and communication system 40 may be satisfactorily used with vending machine 50 and other types of remotely located equipment. System 40 and/or various components of system 40 may be used for a wide variety of machines to machine business transactions. System 40 may include network operations center 26, handheld integration audit device (handheld device) 42 and one or more vending machines 50. For some applications handheld device 42 may be a handheld computer or personal data assistant (PDA). Vending machine 50 as shown in FIG. 2 may include vending machine controller (VMC) 52 operable to control and monitor various electronic components and mechanical components associated with vending machine 50. Vending machine controller 52 may also include audit device 54 having memory 56 and firmware 58.

Audit device 54 may be operable to obtain DEX data via DEX interface or communication link 60 from vending machine controller 52. Audit device 54 may be operable to perform some or all of the functions as previously described with respect to application host 22 in FIG. 1A. For example, audit host 54 may communicate with NOC 26 using communication link 78. Various types of wire-line transmissions and wireless transmissions may be used as part of communication link 78. Audit device 54 may also be operable to obtain multi-drop bus (MDB) data via MDB interface or communication link 62 from vending machine controller 52. Audit device 54 may also obtain MDB data from various peripherals including, but not limited to, cashless reader 64. Audit device 54 may archive or store the DEX data and MDB data in memory 56.

For some applications audit device 54 and VMC 52 may be separate components such as shown in FIG. 2. For other applications audit device 54 and VMC 52 may be formed as integral components (not expressly shown). At some locations with multiple vending machines, one or more vending machines may include VMC 52 and audit device 54 formed as integral components (not expressly shown).

Vending machine 50 may include one or more hardware devices or peripheral devices operable to accept cash, non-cash payment tokens and/or wireless payments. Cashless reader 64 may be representative of such hardware devices and peripherals. Cashless reader or cashless media device 64 may be operable to accept noncash payment tokens such as credit cards, RFID (Radio Frequency Identification Devices) or other media representative of noncash payment. For example vending machine controller 52 may be used to communicate data to audit device 54 and to communicate data from audit device 54 to an application host 150 and/or network operations center 26.

Vending machine 50 may include electronic lock 66 which may also be coupled with audit device 54. Audit device 54 may be configured such that electronic lock 66 may be commanded to engage or disengage in response to signals from audit device 54. Audit device 54 may operate electronic lock 66 by supplying appropriate power and/or digital control signals thereto. For example, audit device 54 may receive a command from handheld device 42 to initiate a sequence for unlocking electronic lock 66. The unlocking sequence may include a request from audit device 54 to electronic lock 66 to obtain a serial number associated with electronic lock 66. Audit device 54 may use the serial number associated with electronic lock 66 to confirm that an electronic key (not expressly shown) may be used to open electronic lock 66 and associated vending machine 50.

To provide operational status feedback to a user, audit device 54 may include a user interface system. In one embodiment, the user interface system may include one or more light emitting diodes (LEDs) operational to communicate status feedback as to one or more aspects of audit device 54 and/or vending machine 50. The user interface subsystem may also include a reset button or an MBD/on-off switch. A secondary user interface subsystem may be available through use of software 44 and handheld device 42.

Vending machine 50 may also include vending hardware 68 and vending inventory 70. Examples of vending machine hardware 68 may include, but are not limited to inventory dispensing apparatus with one or more SKUs, one or more coin acceptance and verification mechanisms, one or more bill acceptance and validation mechanisms or any other hardware device associated with vending machines.

Vending machine 50 may also include secure power input 72 operably coupled to audit device 54. For some applications secure power input 72 may be used to provide power to audit device 54 in the event of power failure to vending machine 50 or at other selected time periods. Secure power input 72 may include an interface including a contact point externally available on vending machine 50 together with one or more suppression and power conditioning hardware devices operable to guard against attack. As shown in FIG. 2, secure power input 72 may be connected with handheld interrogation audit device (handheld device) 42 via link or interface 74 such that audit device 54 may be powered by handheld device 42. Link or interface 74 may include a contact point external to vending machine 50 along with one or more suppression and power conditioning hardware devices (not expressly shown) to guard against attack.

Handheld device 42 may be operable to communicate with audit device 54 using software application 44 at least wireless communications 76. Handheld device 42 and audit device 54 may be equipped with one or more wireless transceivers. Examples of wireless communications that may be satisfactorily used with handheld device 42 and audit device 54 include, but are not limited to, Bluetooth, IEEE802.11a, IEEE802.11b and IEEE802.11g. To enable vending machine 50 to communicate wirelessly with handheld device 42, audit device 54 and handheld device 42 may include respective Bluetooth transceivers (cards) and/or 802.11 transceivers (cards). In part for purposes of failover or redundancy, vending machine 50 and handheld device 42 may also include wired or wire line communication connection capabilities.

In addition to DEX data and MDB data, audit device 54 may record and store other transactions or activities associated with vending machine 50. For example audit device 54 may record information concerning transactions such as the inventory level per SKU frequency, date and time and the identity of each engagement and disengagement of electronic lock 66. In addition, audit device 54 may record operational matters such as compressor failure, vend failures, inventory depletion, correct change events, user selected events as well as other data associated with modern electronic vending machine activities and transactions.

When handheld device 42 and audit device 54 communicate with each other over wireless communication link 76, DEX data and MBD data stored in memory 56 may be transferred on demand to handheld device 42. In addition, handheld device 42 may include one or more software applications 44 operable to command audit device 54 to allow access to vending machine 50. For example, handheld device 42 may be used to disengage electronic lock 66 to provide access to interior portions of vending machine 50.

Handheld device 42 may be used to transfer information to a network operations center using various communication techniques including, but not limited to, direct communication with network operations center 26 similar to the techniques described with respect to portable computer 23 as shown in FIG. 1A.

Data acquisition system 10, data collecting, storing and communication system 40 and a wide variety of other machine to machine communication systems may be used to estimate consumer demand for products or services at remotely located equipment. Data associated with product and/or service sales at the remotely located equipment may be placed in a hierarchy of reliability, quantity and quality. Preferably, the highest level of available data will be used to calculate each consumer demand estimate. When equipment changes and/or problems occur or when changes in products and/or services occur at the remotely located equipment, the highest possible level of data (Level 1 data) may no longer be available. At this time, the highest available level of data, such as Level 2 data through Level 9 data, may be used to calculate a consumer demand estimate. As more reliable data becomes available, the level of data used to calculate consumer demand estimates may increase for example from Level 5 data to Level 3 data to Level 1 data. The method and system will continue to provide consumer demand estimates under operating conditions that degrade reliability of available data and/or upgrade reliability of available data.

Consumer demand estimates may be calculated based on a hierarchy of reliability, quality and quantity of such data. For some applications more than one consumer demand estimate (CDE) may be used to predict future product or service sales, changes in inventory and potential lost sales at remotely located equipment and to prepare dispatch schedules.

The following chart is only one example of data hierarchy that may be used to calculate consumer demand estimates, future sales, future inventory and potential lost sales at remotely located equipment.

| PREDICTIVE MODEL OR DATA HIERARCHY | |
|---|---|
| Level | Data Source |
| CDE-1 | Rich DEX data for products sold per SKU. Recorded and transmitted multiple times per day to a network operations center (NOC). |
| CDE-2 | DEX data for products sold per SKU. Collected by and transmitted from the remotely located equipment to a NOC during each visit at the remotely located equipment. |
| CDE-3 | Delivery data for products sold per SKU. Collected onto a handheld device during each visit at the remotely located equipment. The delivery data transferred from the handheld device to a NOC. |
| CDE-4 | Product data per SKU taken from historical records maintained by an owner/operator. Not DEX data. Typically data taken from accounting recorder associated with servicing the remotely located equipment. |
| CDE-5 | Rich DEX data from all products sold. Not per SKU. Recorded and transmitted multiple times per day to a NOC. Various techniques may be used at the NOC to convert DEX data for all products sold into estimated product sales per SKU. |
| CDE-6 | DEX data for all products sold. Not per SKU. Collected by and transmitted from the remotely located equipment to a NOC during each visit at the remotely located equipment. Various techniques may be used at the NOC to convert DEX data for all products sold into estimated product sales per SKU. |
| CDE-7 | Delivery data for all products sold. Not per SKU. Collected onto a handheld device during each visit at the remotely located equipment. The delivery data transferred from the handheld device to a NOC. |

| PREDICTIVE MODEL OR DATA HIERARCHY | |
| --- | --- |
| Level | Data Source |
| CDE-8 | Various techniques may be used at the NOC to convert delivery data for all products sold into estimated product sales per SKU. Product data for the remotely located equipment taken from historical records maintained by a client. Not DEX data. Not per SKU. Typically taken from accounting records associated with servicing the remotely located equipment. |
| CDE-9 | Assumed product sales such as 40% sell down on all SKUs per week. |

The highest level of reliability and confidence will typically be assigned to DEX data which is automatically collected per SKU on a routine basis multiple times per day and transmitted to a network operations center. Such DEX data may then be analyzed and evaluated in accordance with teachings of the present disclosure. For some applications, DEX data per SKU may be taken four or more times per day using an audit device or other components capable of communicating DEX data and transmitted to a network operations center using an external network to qualify as CDE-1 Level data.

CDE-2 Level data will generally be more sparse or less rich than DEX data associated with CDE-1 Level data. When DEX data collection occurs only every few days or may be once per week or once every two weeks, the decreased amount of DEX data may result in a consumer demand estimate which is less likely to match actual or true consumer demand as compared with CDE-1 Level data. As a result, predictions of future sales, future inventory and/or potential lost sales based on consumer demand estimates calculated using CDE-2 Level data may have lower confidence and lower reliability as compared with the predictions based on consumer demand estimates resulting from calculations based on CDE-1 Level data.

The reliability, quantity and quality of CDE-3 Level data may be less than the reliability, quantity and quality of CDE-2 Level data. For example, a person servicing the remotely located equipment may not fully fill each SKU or one or more SKUs may run out of product prior to servicing of the remotely located equipment. As a result, the delivery data collected in a handheld device may be less accurate than DEX data collected by the remotely located equipment and transmitted directly from the remotely located equipment to a network operations center. For some applications CDE-3 Level data may be described as generally representing the amount of products placed in each SKU during a visit at the remotely located equipment.

The owner or operator's accounting records properly reflect the amount of products delivered to each SKU at the remotely located equipment, CDE-4 Level data may correspond approximately with the CDE-3 Level data. CDE-3 Level data may be easier to analyze and evaluate since such data will often be in digital format and may include other information such as equipment operating status and/or status of associated communication networks. CDE-4 Level data may be more difficult to review and/or evaluate for inconsistencies. CDE-4 Level data may be beneficial for use in comparing with CDE-3 Level data to confirm or validate the reliability of CDE-3 Level data.

For some applications DEX data may be collected multiple times per day for all products sold at the remotely located equipment. For various reasons the DEX data may not be provided on a per SKU basis. For example, data transmissions associated with one or more SKUs may be inaccurate and/or inoperative. Also, one or more product changes may have occurred at a remote location. Various techniques may be used to estimate product sales on a "per SKU basis" for CDE-5 Level data. For example, if DEX data for several SKUs is available, such DEX data may be used to provide an estimate for any remaining SKUs for which specific DEX data is not available.

Other techniques may also be used to convert total product sales at remotely located equipment into estimated product sales per SKU. Sometimes simple averages may be used. Past operating history may also be used to provide estimated product sales per SKU. Typically, the reliability of DEX data maintained per SKU will be greater than DEX data associated with all products sold at remotely located equipment.

CDE-6 Level data may be DEX data for all products sold at remotely located equipment between visits and transmitted only from the remotely located equipment at the time of each visit. Such DEX data may then be converted into estimated product sales per SKU.

CDE-7 Level data will generally be less reliable than CDE-6 Level data and CDE-8 Level data will generally be less reliable than CDE-7 Level data.

CDE-9 Level data may represent the lowest level of data which may be used to calculate a consumer demand estimate. CDE-9 Level data typically results in a fixed dispatch schedule for servicing remotely located equipment.

One of the benefits of the present disclosure may include the ability to calculate consumer demand estimates, future sales, future inventory and potential loss sales with the highest amount of reliability possible even though portions of the data may be incomplete and/or various equipment problems may have occurred at the remotely located equipment. Calculating consumer demand estimates based on a hierarchy of data reliability, quality and quantity may minimize the possibility of one or more products or services prematurely selling out, may allow optimum allocation of limited inventory space, may enable longer time between refills and/or may increase refill rates during each visit at the remotely located equipment.

Various decision trees or procedures may be used to select the level of data (CDE-1 through CDE-9) used to calculate each consumer demand estimate. The appropriate level may be selected based on product changes, price changes, SKU added, SKU removed, equipment problems, equipment changes and/or modifications at the remotely located equipment. Refill data recorded during servicing of remotely located equipment may also be used. Refill data that does not contain SKU information may be excluded. Settlement data from a service center responsible for maintaining the remotely located equipment may also be used. Settlement data that contains negative numbers for any SKU may be excluded.

Inventory levels will either stay the same between visits at remotely located equipment (no consumer demand or equipment malfunction) or decrease over time. Any DEX readings which indicate an increase in inventory between visits at remotely located equipment should be discarded as resulting from an equipment malfunction or a data transmission error.

Figure 3A:
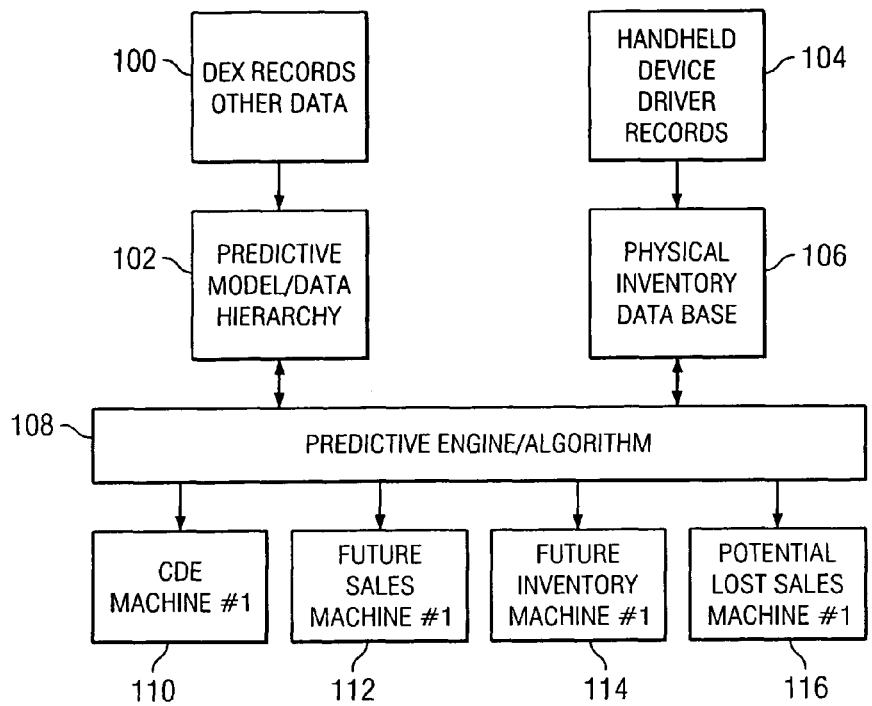
FIG. 3A is a block diagram showing one example of a method for calculating consumer demand estimates, future sales, future inventory and potential lost sales at remotely located equipment.

FIG. 3A is a block diagram showing one example of a method which may be used to calculate consumer demand estimates, future sales, future inventory and potential lost sales at remotely located equipment. At step 100 data from the remotely located equipment in the form of DEX records, MBD records or other data may be loaded into a predictive model or data hierarchy. At step 102 the data may be arranged in a hierarchy or levels of data such as CDE-1 through CDE-9. However, other data hierarchies may be used. At step 104 a physical inventory of products for sale and/or materials required to perform services at the remotely located equipment may be placed in a handheld device or other driver records. At step 106 the product and/or material inventory may be loaded into a physical inventory database.

At step 108 a predictive engine or predictive algorithm may select data and equipment operating status data from the highest level available in data hierarchy. For example, if an equipment malfunction occurs the predictive algorithm may select data from a lower level of reliability. When the equipment malfunction is repaired, the predictive algorithm may progressively select data from higher levels of reliability. The predictive algorithm may then calculate a consumer demand estimate for each SKU at the remotely located equipment. The consumer demand estimate may also be provided with a confidence number. Future sales per SKU, future inventory per SKU and potential lost sales per SKU may also be calculated by the predictive algorithm based upon the consumer demand estimate and data selected from physical data inventory base. For the example shown in FIG. 3A, predictive algorithm may be used to produce a consumer demand estimate per SKU for machine #1 at step 110. Future sales per SKU for machine #1 may be calculated at step 112. Future inventory per SKU for machine #1 may be calculated at step 114. Potential lost sales for machine #1 may be calculated at step 116. This information may be transmitted from NOC 26 to one or more client interfaces 34.

Figure 3B:
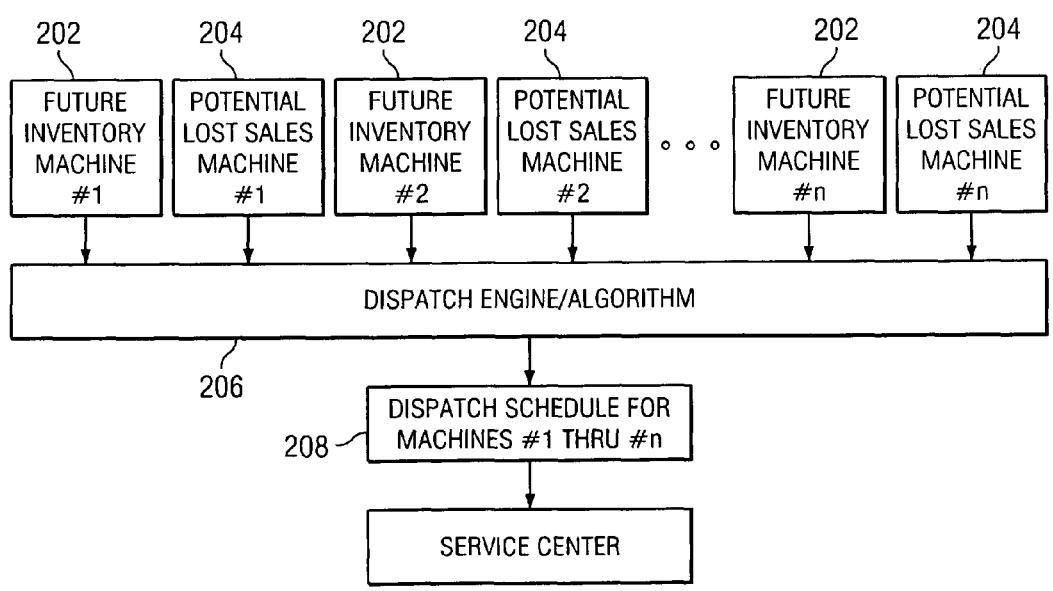
FIG. 3B is a block diagram showing one example of a method for calculating a dispatch schedule for remotely located equipment using future inventory and potential lost sales to establish a dispatch schedule for multiple units of remotely located equipment.

A predictive algorithm having the following characteristics may be used to calculate consumer demand estimates, predict future sales of products and/or services, changes in inventory and potential lost sales at remotely located equipment. A dispatch algorithm may be used to prepare dispatch schedules for remotely located equipment based on these predications. FIG. 3B shoes one example of a dispatch algorithm using future inventory and features lost sales to prepare a dispatch schedule. The dispatch algorithm may be used to schedule servicing of remotely located equipment as near as possible to the optimal fill time, taking into account other factors, such as servicing other remotely located equipment on the same route, maximum daily visitations and ad-hoc requests. One objective of the predictive algorithm is to provide input for a dispatch algorithm to use in preparing a dispatch schedule for servicing remotely located equipment which is better than a fixed dispatch schedule and closer to the optimal refill time for each machine on the same dispatch schedule.

FIG. 3B is a block diagram showing various steps associated with preparing a dispatch schedule for a service center (not expressly shown) responsible for maintaining remotely located equipment such as machine #1 through machine #n as shown in FIG. 1. At step 202 future inventory per SKU for machine #1 through machine #n may be supplied to the dispatch algorithm. Future lost sales for machine #1 through machine #n may be supplied to the dispatch algorithm at step 204. As previously noted, inventory at remotely located equipment will either stay the same (no sales) or decrease over time between visits at the remotely located equipment. The predictive algorithm may develop curves or graphs for the projected decreases in inventory per SKU at each machine #1 through machine #n. At step 206 the dispatch algorithm may then calculate a dispatch schedule for machine #1 through machine #n based on a comparison of the values of predicted future inventory and predicted potential lost sales for machine #1 through machine #n serviced from the same service center. At step 208 the dispatch schedule may be transmitted to the service center.

There is generally an optimal time for visiting remotely located equipment. Visiting prior to this time often results in sub-optimal fill and visiting after this time often results in possible lost sales from an out-of-stock condition in one or more SKUs. The optimal time for a visit at remotely located equipment may be determined based on previously gathered data, including but not limited to past visitation history, past inventory fill information and DEX records. The optimum time for visiting remotely located equipment may sometimes be referred to as the "prime dispatch date."

Remotely located equipment may have a fixed dispatch schedule or a dynamic dispatch schedule. The dispatch schedule must be fixed for various conditions or reasons. For example, the remotely located equipment may not have equipment required to collect, store and/or transmit DEX data. The remotely located equipment may not be capable of providing readable DEX data. A route manager may explicitly set the remotely located equipment to use a fixed schedule.

A fixed schedule may often be recommended for remotely located equipment with a high volume of product or service sales. A fixed schedule may also be recommended for remotely located equipment which does not follow a normal sales cycle. Seemingly haphazard spikes and troughs in product or service sales for such remotely located equipment may make predictability unreliable.

A dynamic dispatched schedule may often be used if data such as CDE-8 Level data or higher is available for use in calculating consumer demand estimates. Regardless of whether the remotely located equipment is on a fixed or dynamic dispatch schedule, if the remotely located equipment is capable of providing DEX data then the DEX data may be processed and consumer demand estimates, future sales, changes in inventory and potential lost sales may be computed using the predictive algorithm and maintained in a database such as database 30.

The predictive algorithm may maintain various data points for each remotely located equipment, the Cumulative Ideal Refill Cycle and an associated "prime dispatch day." A refill cycle may be defined as the time from one remotely located equipment refill to the next. Data from each refill may be used to generate two additional data points associated from the current refill cycle, the Ideal Refill Cycle and a Confidence Level. For some applications the four most recent refill cycles may be used to compute the Cumulative Ideal Refill Cycle.

The predictive algorithm may have two phases-a learning phase and a predicting phase. Remotely located equipment may enter a learning phase when the remotely located equipment is newly installed or when the remotely located equipment has undergone change in SKU. The remotely located equipment may also enter a learning phase after a change in products or services available at the remotely located equipment.

While in the learning phase, a fixed dispatch schedule may be used to service the remotely located equipment. The remotely located equipment may stay in the learning phase until it has been serviced twice with no space to sales changes. After the second dispatch or service, the remotely located equipment may transition into the predicting phase. The initial Ideal Refill Cycle and Confidence may be computed using the data collected between the two most recent refills. The learning phase may be bypassed if the remotely located equipment was manually put a on fixed dispatch schedule and then transitioned to dynamic dispatch after two or more visitations during its fixed dispatch.

Once remotely located equipment enters a predicting phase, it may go through a series of refill cycles. DEX data gathered during each refill cycle may be used to update the Ideal Refill Cycle and the Cumulative Ideal Refill Cycle. Any DEX data which falls outside the four most recent refill cycles may be considered stale and not used.

For some applications the predicting phase may include the following steps. A route driver visits the remotely located equipment and performs a refill. The route driver may collect a single "refill" DEX record and all of the archived DEX records available at the remotely located equipment on a portable computer or a handheld device. When the route driver returns at the end of the day, the portable computer or handheld device may download the DEX records to a network operations center using a client interface.

Pre-analysis of the DEX records may include removing any archived DEX records outside the current refill cycle. DEX records older than the current refill record (prior refill records) and any data newer than the current refill record may be deleted. The Pre-analysis may check for any SKU changes in the DEX records within the current refill cycle. If the check for SKU changes detects a space to sales change (relationship between buttons to select a product and the number or trays assigned to each button), the remotely located equipment may be put back into the learning phase for two additional refill cycles.

The Pre-Analysis steps may end by ordering the DEX records by timestamp and updating the inventory for each SKU based on the space to sales mapping. If a physical inventory is provided by equipment such as portable computer 23 or handheld device 42, this inventory value may also be used by the predictive algorithm. See FIG. 3A steps 104 and 106. Otherwise, each SKU may be assumed to be filled to capacity. Based only on the most recent DEX records parsed thus far, the predictive algorithm may determine if the remotely located equipment should be dispatched based on the Cumulative Ideal Refill Cycle.

There are three possibilities as this point:
1. The prime dispatch day occurs on the same date as the refill date.
2. The prime dispatch day occurs on a calendar day prior to the refill date.
3. After processing all DEX gathered from the refill cycle, the prime dispatch day never occurs.

In the first case, the refill cycle was of exactly the right length. The Ideal Refill Cycle for this refill cycle is set to the length of the refill cycle.

In the second case, the refill cycle was too long. The Ideal Refill Cycle is set to the number of days between the start of the refill cycle and the prime dispatch date.

In the third case, the refill cycle was too short. At this point the predictive algorithm may set the Ideal Refill Cycle to the length of the refill cycle plus an additional 2 to 5 days, determined randomly.

In addition to the Ideal Refill Cycle, the predictive algorithm may also maintain a Confidence Level for each Ideal Refill Cycle. The predictive algorithm may keep track of mechanical errors as it parses the DEX records. The Confidence Level may be computed as the amount of time spent in an error free state divided by the total amount of time for all DEX records gathered between the start of the current refill cycle and the prime dispatch date. If the prime dispatch date is never reached, data from the entire cycle may be used. This produces a ratio between 0 and 1, with 0 indicating no confidence (every DEX record occurred during a mechanical error) and 1 indicating complete confidence (no mechanical errors for the entire cycle).

Once a refill cycle is complete and the Ideal Refill Cycle and Confidence have been calculated, the predictive algorithm may update the Cumulative Ideal Refill Cycle. This may be done by computing a weighted sum for the last four refill cycles. The following equation may be used to compute a weighted sum:

Cumulative Ideal Refill Cycle=sum(idealRefillSpan$_i$ ConfidenceRatio$_i$ weight$_i$); $i$=1 . . . 4 confidenceRatio$_i$=Confidence$_i$/sum (Confidence Levels.); $i$=1 . . . 4

"Weight" is a fraction which is highest for the most recent cycle and decreases with each previous cycle. The sum of all weights will always equal, so as not to affect the computed refill span. If there are less than four completed refill cycles since the remotely located equipment entered the predictive phase, "i" cycles from 1 to the number of completed cycles and the weights are adjusted accordingly.

If none of the last four refill cycles have a confidence of at least 0.6, the remotely located equipment may be serviced next according to a fixed dispatch schedule. If at least one of the refill cycles has a confidence of 0.6 or greater, the remotely located equipment may be serviced on a variable dispatch schedule such as the next Cumulative Ideal Refill Cycle day "cumulativeIdealRefillSpan" after the end of the last refill cycle.

The predictive algorithm may satisfactorily function with only a minimal amount of data such as CDE-9 Level data. With the exception of historical refill spans and confidence levels, the data required to predict an initial dispatch schedule may be stateless and heuristic-free. There is no need to maintain sales rates, sales trends, or any other potentially difficult to compute heuristics. Instead, the dispatch algorithm may establish an initial dispatch schedule based on an initial consumer demand estimate. The predictive algorithm may use additional DEX data to determine variations between the initial dispatch schedule and an optimum dispatch schedule based on the new DEX data. The dispatch algorithm may then use such data from the predictive algorithm to calculate a revised dispatch schedule to approximate the optimum dispatch schedule based on the revised consumer demand estimate. This process may be repeated as additional DEX data is collected for each product or service sold at the remotely located equipment. The results of the predictive algorithm may be compared with the operating history of the remotely located equipment to confirm that mechanical errors and equipment problems have been satisfactorily corrected.

Examples of the comparisons which may be made with the operating history of remotely located equipment including, but are not limited to, comparing the amount of inventory refill during each visit with the machine capacity. For some products and/or services, if the amount of refill is greater than 60% of the machine capacity, the refill rate may be considered satisfactory. If the amount of refill is less than 60% of the machine capacity, the refill rate may be considered unsatisfactory indicating that mechanical errors or equipment problems have not been satisfactorily corrected and/or available products and/or services do not meet customer needs.

Predicted future product sales or future service sales may be compared with actual product sales or service sales at the remotely located equipment. If the average variation between the predicted sales and the actual average sales at the remotely located equipment is less than a selected number of units such as ten products per day, the remotely located equipment may be considered as operating satisfactorily. If the difference between the average actual sales and the predicted sales is greater than 20 units per day, this difference may indicate that mechanical errors and/or equipment problems have not been corrected and/or available products and/or services do not meet customer needs.

If the DEX data indicates that the remotely located equipment spent less than 10% of the time between visits with a consumer noticeable problem, the equipment operating status may be considered as satisfactory. If the remotely located equipment spent more than 10% of the time with a consumer noticeable problem, the equipment operating status may be considered as unsatisfactory. The variation in product sales and the percentage of time with a noticeable consumer error may be modified for each type of remotely located equipment and for the various types of products and/or services available at the remotely located equipment. The predictive algorithm and the resulting information may also be utilized to identify visits at remotely located equipment which are nonproductive such as refill rate 0 or less than 10% of capacity. The predictive algorithm may further indicate when the remotely located equipment is serviced more frequently than called for by the dispatch schedule.

Although the present disclosure has been described with respect to some embodiments, various changes and modifications may be suggested to one skilled in the art and it is intended that such changes and modifications fall within the scope of the appended claims.

What is claimed is:

1. A method for estimating consumer demand for a product based on sales data for the product at remotely located equipment comprising:
   receiving in an application server first inventory level data from the remotely located equipment, wherein the first inventory level data represents product inventory levels in the remotely located equipment, the product inventory levels recorded at multiple time intervals;
   receiving in the application server equipment operating status data from the remotely located equipment, wherein the equipment operating status data represents equipment operating status of the remotely located equipment, the equipment operating status recorded at multiple time intervals;
   arranging in the application server the received first inventory level data and the received equipment operating status data in associated levels of a data hierarchy of reliability, quality and quantity;
   storing in the application server the received first inventory level data and the received equipment operating status data and associated levels of the data hierarchy; and
   calculating in the application server a consumer demand estimate for the product based on the levels of the data hierarchy of the stored first inventory level data and the stored equipment operating status data.

2. The method of claim 1 further comprising using highly reliable, rich historical sales data and equipment operating status to calculate in the application server a consumer demand estimate for the product corresponding approximately with a conventional store operating satisfactorily twenty four hours per day with an optimum staff and an optimum inventory of the product for sale at the same location as the remotely located equipment.

3. The method of claim 1 further comprising:
   receiving in the application server first actual sales data from the remotely located equipment, wherein the first actual sales data represents actual sales of the product at the remotely located equipment for a first time period;
   storing in the application server the received first actual sales data;
   comparing in the application server the stored first actual sales data of the product for the first time period with projected sales of the product using the estimated consumer demand;
   identifying in the application server from the first comparison a corrective action at the remotely located equipment to improve actual sales of the product;
   receiving in the application server second actual sales data from the remotely located equipment, wherein the actual sales data represents actual sales of the product at the remotely located equipment for a second time period;
   storing in the application server the received second actual sales data;
   comparing in the application server the stored second actual sales data for the second time period with a consumer demand estimate for the second time period; and
   the application server identifying from the second comparison a further corrective action at the remotely located equipment to improve actual sales of the product.

4. The method of claim 1 further comprising censoring in the application server time periods from calculation of the consumer demand estimate when the remotely located equipment is not operating satisfactorily.

5. The method of claim 1 further comprising estimating in the application server consumer demand by evaluating product sales for only those time periods when adequate inventory of the product was available at the remotely located equipment and the remotely located equipment was operating satisfactorily.

6. The method of claim 1 further comprising receiving in the application server second inventory level data from the remotely located equipment, wherein the second inventory level data represents inventory levels for each stock keeping unit, the inventory levels recorded at the remotely located equipment.

7. The method of claim 1 further comprising predicting in the application server future sales, future inventory and potential lost sales of the product based on the calculated consumer demand estimates.

8. The method of claim 1 further comprising receiving in the application server third inventory level data from the remotely located equipment, wherein the third inventory level data represents inventory levels for different types of the same product, the inventory levels recorded at the remotely located equipment.

9. The method of claim 1 further comprising:
   receiving in the application server equipment problem data, wherein the equipment problem data represents equipment problems occurring at the remotely located equipment recorded at the remotely located equipment;
   storing in the application server the received equipment problem data; and
   revising in the application server an associated dispatch schedule in response to the stored equipment problem data.

10. The method of claim 1 further comprising comparing in the application server actual product sales at the remotely located equipment with predicted product sales based on the consumer demand estimate to identify mechanical errors and equipment problems at the remotely located equipment which require corrective action.

11. A method for estimating consumer demand for a service based on sales data for the service at remotely located equipment comprising:
   receiving in an application server first inventory level data from the remotely located equipment, wherein the first inventory level data represents service inventory levels in the remotely located equipment recorded at multiple time intervals;

receiving in the application server equipment operating status data from the remotely located equipment, wherein the equipment operating status data represents equipment operating status of the remotely located equipment recorded at multiple time intervals;

arranging in the application sever the received first inventory level data and the received equipment operating status data in associated levels of a data hierarchy of reliability, quality and quantity;

storing in the application server the received first inventory level data and the received equipment operating status data and associated levels of the data hierarchy; and calculating in the application server a consumer demand estimate for the service based on the levels of the data hierarchy of the stored first inventory level data and the stored equipment operating status data.

12. The method of claim 11 further comprising using highly reliable rich historical sales data and equipment operating status to calculate in the application server a consumer demand estimate for the service corresponding approximately with a conventional store operating satisfactorily twenty four hours per day with an optimum staff and an optimum inventory of materials to perform the service for sale at the same location as the remotely located equipment.

13. The method of claim 11 further comprising:
receiving in the application server first actual sales data from the remotely located equipment, wherein the first actual sales data represents actual sales of the service at the remotely located equipment for a first time period;
storing in the application server the received first actual sales data;
comparing in the application server the stored first actual sales data of the service for the first time period with projected sales of the service using the estimated consumer demand;
identifying in the application server from the first comparison a corrective action at the remotely located equipment to improve actual sales of the service;
receiving in the application server second actual sales data from the remotely located equipment, wherein the actual sales data represents actual sales of the service at the remotely located equipment for a second time period;
storing in the application server the received second actual sales data;
comparing in the application server the stored second actual sales data for the second time period with a consumer demand estimate for the second time period; and
the application server identifying from the second comparison a further corrective action at the remotely located equipment to improve actual sales of the service.

14. The method of claim 11 further comprising censoring in the application server time periods from calculation of the consumer demand estimate when the remotely located equipment is not operating satisfactorily.

15. The method of claim 11 further comprising estimating in the application server consumer demand by evaluating service sales for only those time periods when adequate inventory of the service was available at the remotely located equipment and the remotely located equipment was operating satisfactorily.

16. The method of claim 11 further comprising receiving in the application server second inventory level data from the remotely located equipment, wherein the second inventory level data represents inventory levels of materials required to perform each service, the inventory levels recorded at the remotely located equipment.

17. The method of claim 11 further comprising predicting in the application server future sales, future inventory of materials required to provide services and potential lost sales of services based on the calculated consumer demand estimate.

18. The method of claim 11 further comprising receiving in the application server third inventory level data from the remotely located equipment, wherein the third inventory level data represents inventory levels of materials required to perform different types of the same service, the inventory levels recorded at the remotely located equipment.

19. The method of claim 11 further comprising receiving in the application server equipment problem data, wherein the equipment problem data represents equipment problems occurring at the remotely located equipment recorded at the remotely located equipment;
storing in the application server the received equipment problem data; and
revising in the application server an associated dispatch schedule in response to the stored equipment problem data.

20. The method of claim 11 further comprising comparing in the application server actual service sales at the remotely located equipment with predicted service sales based on the consumer demand estimate to identify mechanical errors and equipment problems at the remotely located equipment which require corrective action.

21. A system for acquiring product sales data from remotely located equipment and calculating a consumer demand estimate for at least one product sold at the remotely located equipment, the system comprising:
a network operations center; and
an external network operable to communicate information between the network operations center and the remotely located equipment,
wherein the network operations center is operable to:
send a request for data to the remotely located equipment;
receive product sales records and equipment operating status records from the remotely located equipment;
arrange the product sales records and equipment operating status records in associated levels of a data hierarchy of reliability, quality and quantity;
store the product sales records and equipment operating status records and associated levels of the data hierarchy;
analyze product sales records and equipment operating status records; and
calculate a consumer demand estimate for each product sold at the remotely located equipment based on the levels of the data hierarchy of the stored product sales records and the equipment operating status records.

22. The system of claim 21 further comprising a handheld device operable to request data from the remotely located equipment and to communicate data received from the remotely located equipment to the network operations center.

23. The system of claim 21 wherein the network operations center is further operable to calculate future product sales, future product inventory and predicted lost sales based on the calculated consumer demand estimate.

24. The system of claim 21 wherein the network operations center is further operable to prepare a dispatch schedule for the remotely located equipment based on the predicted future inventory and potential lost sales for the product.

25. A system for acquiring service sales data from remotely located equipment and calculating a consumer demand estimate for at least one service provided at the remotely located equipment, the system comprising:
- a network operations center; and
- an external network operable to communicate information between the network operations center and the remotely located equipment,
- wherein the network operations center is operable to:
  - send a request for data to the remotely located equipment;
  - receive service sales records and equipment operating status records from the remotely located equipment;
  - arrange the service sales records and equipment operating status records in associated levels of a data hierarchy of reliability, quality and quantity;
  - store the service sales records and equipment operating status records and associated levels of the data hierarchy;
  - analyze product sales records and equipment operating status records; and
  - calculate a consumer demand estimate for each service sold at the remotely located equipment based on the levels of the data hierarchy of the stored service sales records and the equipment operating status records.

26. The system of claim 25 further comprising a handheld device operable to request data from the remotely located equipment and to communicate data received from the remotely located equipment to the network operations center.

27. The system of claim 25 wherein the network operations center is further operable to calculate future service sales, fixture service inventory and predicted lost service sales based on the calculated consumer demand estimate.

28. The system of claim 25 wherein the network operations center is further operable to prepare a dispatch schedule for the remotely located equipment based on the predicted future service inventory and potential lost service sales for the product.

* * * * *